United States Patent
Van Scyoc et al.

[11] Patent Number: 6,158,717
[45] Date of Patent: Dec. 12, 2000

[54] QUICK-ACTION FLUID COUPLING

[75] Inventors: Thomas W. Van Scyoc, Gastonia; Phillip G. Wilson, Mooresville; Michael J. Suggs, Gastonia, all of N.C.

[73] Assignee: Perfecting Coupling Company, Charlotte, N.C.

[21] Appl. No.: 09/550,815

[22] Filed: Apr. 18, 2000

[51] Int. Cl.[7] ................................................. F16L 37/28
[52] U.S. Cl. .............................. 251/149.6; 137/614.02; 137/614.03
[58] Field of Search ..................... 137/614.02, 614.03, 137/614.04, 614.05, 614; 251/149.1, 149.6

[56] References Cited

U.S. PATENT DOCUMENTS

| | | | |
|---|---|---|---|
| 3,797,510 | 3/1974 | Torres et al. | 137/614.04 X |
| 4,098,292 | 7/1978 | Evans | 137/614.04 |
| 4,213,482 | 7/1980 | Gondek . | |
| 4,373,551 | 2/1983 | Shindelar . | |
| 4,398,561 | 8/1983 | Maldavs | 137/614.05 |
| 4,540,021 | 9/1985 | Rogers . | |
| 4,617,975 | 10/1986 | Rabushka et al. . | |
| 4,898,199 | 2/1990 | Morris et al. . | |
| 4,899,786 | 2/1990 | Morris et al. . | |
| 4,974,636 | 12/1990 | Hanus et al. . | |
| 5,092,364 | 3/1992 | Mullins . | |
| 5,123,446 | 6/1992 | Haunhorst et al. . | |
| 5,255,714 | 10/1993 | Mullins . | |
| 5,540,250 | 7/1996 | Mullins . | |

OTHER PUBLICATIONS

"Double Shut–Off, Interchangeable Couplings", Hydraulic Tool Manufacturer's Association, pp. 107–109.
ISO 1999 article, pp. 3–4.
Brochure by Faster for Series 2FN38 product.
Internet advertisement for Snap–Tite, Inc. for 74 Series HTMA Interchange Coupling.
Brochure by Parker Fluid Connectors, pp. B–27, B–28 and B–63.
Brochure by Integrated Technology re Flat Face Couplings (9 pages).
Brochure by Aeroquip re Fluid Transfer & Hydraulic Quick Disconnect Couplings, pp. 45–47.
Internet advertisement for Tomco Quick Couplers (4 pages), Dec. 9, 1999.
Internet advertisement for SafeWay Quick Couplers (2 pages), Dec. 9, 1999.
Brochure by Parker Fluid Connectors, pp. B–33, B–34 and B–63.

*Primary Examiner*—Kevin Lee
*Attorney, Agent, or Firm*—Alston & Bird LLP

[57] ABSTRACT

A quick-action fluid coupling for connecting two fluid-conducting lines includes a plug for attachment to one of the lines and a socket for attachment to the other. The socket has a tubular body and includes a valve having a valve sleeve and a fixed valve stem coaxially disposed within the tubular body. The valve sleeve is moved axially upon connection of the plug and socket so as to open a fluid flow passage between the valve sleeve and the valve stem. The outer surface of the valve stem defines a plurality of circumferentially spaced depressions therein. A circumferential groove is defined in an inner surface of the tubular body and is spaced radially outward of and in axial alignment with the depressions in the valve stem. A plurality of separately formed, discrete retaining elements are respectively engaged partly in the depressions in the valve stem and partly in the groove in the tubular body. Each retaining element is captively retained between forwardly and rearwardly inclined surfaces of the corresponding depression and between forwardly and rearwardly inclined surfaces of the groove. Thus, the retaining elements cooperate with the surfaces of the groove and of the depressions to prevent axial movement of the valve stem. The plug includes a valve member that is slid to an open position by engagement with the valve stem of the socket when the plug is inserted into the socket.

32 Claims, 2 Drawing Sheets

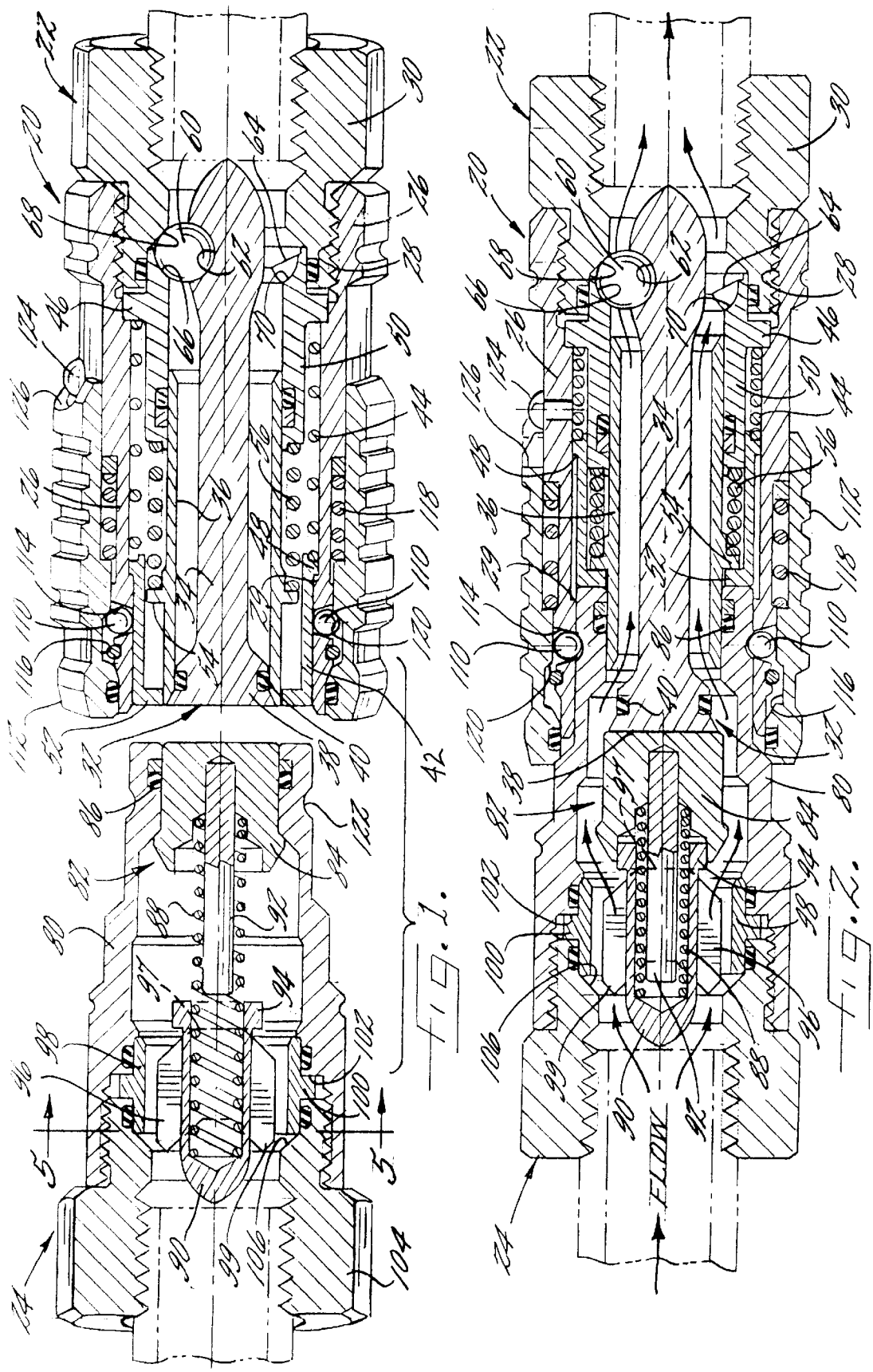

QUICK-ACTION FLUID COUPLING

FIELD OF THE INVENTION

The invention relates to quick-action fluid couplings for connecting two fluid lines together so that fluid can be conducted from one line to the other. The invention relates more particularly to a quick-action fluid coupling having a plug on one fluid line that is inserted into a socket on the other fluid line, in which the socket includes a valve having a fixed valve stem and a movable valve member that interacts with the valve stem to open and close the valve.

BACKGROUND OF THE INVENTION

Hydraulic fluid power systems are used to operate a variety of types of machinery. Hydraulic systems transmit and control power for operating machinery by forcing water, oil, or other liquid under pressure through a fluid circuit composed of fluid conducting lines. Hydraulic jacks, tools for applying torque, and other hydraulic tools and machinery may be operated at high fluid pressures, for example as high as 10,000 psi.

Fluid couplings for the fluid lines supplying pressurized fluid to tools and machinery typically comprise a generally cylindrical socket having an axial fluid flow passage, and a generally cylindrical plug also having an axial fluid flow passage. The socket is attached to one fluid line and the plug is attached to another fluid line. The plug is pushed into the socket to join the two lines and establish a single fluid flow passage between the two lines. The coupling may be free-standing or the plug or the socket may be mounted in a manifold or wall or otherwise secured within the tool or machinery.

For many years, a mechanical connection of the socket to the plug for preventing separation of the two coupling members was provided by a threaded sleeve connected to the socket, and mating threads on the plug, so that the sleeve could be screwed onto the plug. This provided a very secure connection, but making the connection and removing the plug from the socket required considerable time, and often required a wrench or the like for providing sufficient torque to screw and unscrew the sleeve.

Accordingly, designers developed quick-action fluid couplings that enable the plug to be connected to the socket simply by pushing the plug into the socket. Quick-action couplings thus enable connections to be made quickly and without tools. Generally, a quick-action socket has a plurality of circumferentially spaced locking balls contained in apertures arranged in a circle around the plug-receiving end of the socket. A spring-biased detent sleeve circumscribing the socket can be axially moved so as to push the locking balls radially inwardly through the apertures. The plug has an annular groove to receive the portions of the locking balls that protrude through the apertures. When the plug is inserted into the socket and the locking balls are received in the groove in the plug, the locking balls prevent the plug from being pulled out of the socket. The plug is disconnected from the socket by sliding the detent sleeve so that the balls are free to move back through the apertures.

Various types of such quick-action fluid couplings have been developed, including the flat-face or flush-face coupling. In a flat-face coupling, the plug and socket are designed such that when the plug is disconnected from the socket, both the plug and socket present flat end faces. Thus, there are no recesses in the ends of the plug or socket in which fluid can collect and subsequently drip from after the coupling has been disconnected. The flat-face coupling also enables the coupling to be connected and disconnected without leakage while the fluid in the lines is under pressure.

A typical socket for a flat-face coupling is depicted in U.S. Pat. No. 5,123,446. The socket or female part includes a valve stem that terminates at one end in a valve head. A valve sleeve is sleeved over the valve and is larger in inside diameter than the outside diameter of the valve stem such that a space for conducting fluid through the socket is defined in the annular region between the valve sleeve and the valve stem. The valve sleeve is slidably disposed within a tube and an adapter is screwed into a rear end of the tube. The tube and adapter together define an internal fluid passage that feeds fluid from a fluid line attached to the adapter into the annular space between the valve stem and valve sleeve. When the female part is disconnected from the plug or male part, the forward end of this annular space is closed by engagement between the forward end of the valve sleeve and the valve head of the valve stem, with the aid of an O-ring surrounding the valve head. The valve sleeve is constantly urged forward to close the fluid flow path by a spring whose rear end abuts a shoulder defined at the end of the adapter. The valve stem is held stationary by a spider disposed in the passage of the female part. The spider has a central hole and the rear end of the valve stem extends through this hole. The rear end of the valve stem is threaded, and an acorn nut is secured to the threaded end to restrain the valve stem from moving axially in the forward direction. Axial movement of the valve stem in the rearward direction is prevented by a conical flared portion of the valve stem abutting the spider. When the male part is pushed into the female part, the valve sleeve is pushed rearwardly by a portion of the male part, and the valve stem in the female part opens a valve in the male part, so that a continuous fluid flow path is created between the female part and the male part. The spider includes apertures through which the fluid flows.

To ensure proper operation of the socket valve, it is important that the valve stem be rigidly affixed within the socket. In a conventional flat-face socket such as exemplified in the '446 patent, the valve stem is secured by a spider. In some cases, as in the '446 patent, the valve stem is externally threaded on its end and a nut is screwed onto the end of the stem to secure it to the spider, or the spider itself is internally threaded and is screwed onto the threaded end of the valve stem. A drawback of this approach is that the threads on the valve stem can easily be damaged during handling prior to assembly, thereby requiring reworking the stem or scrapping it altogether.

In other flat-face sockets, the end of the valve stem is passed through a central hole in the spider and is then swaged to prevent the stem from being separated from the spider. This has the disadvantage that if the valve stem becomes damaged or worn so as to require replacement, the valve stem cannot easily be replaced without special tools; accordingly, the entire assembly of valve stem and spider is typically replaced as a unit. Furthermore, the assembly of the valve stem with the spider requires specialized tooling for swaging the end of the valve stem.

SUMMARY OF THE INVENTION

The above needs are met and other advantages are achieved by the present invention, which provides a quick-action fluid coupling having first and second coupling members one of which is inserted into the other to establish a fluid flow passage therebetween. The coupling has a construction that facilitates assembly without requiring any specialized tooling for fixing the valve stem in the corresponding coupling member, and facilitates repairability of the coupling member by enabling the valve stem to be easily removed and replaced independently of any other parts, if desired. The construction also eliminates the use of threads on the valve stem, thereby providing a more rugged part.

To these ends, the coupling in one embodiment includes a first coupling member including a tubular body having an axial fluid flow passage therethrough and having a rear end for connection with a first fluid-conducting line and an opposite forward end, and a second coupling member including a tubular body having an axial fluid flow passage therethrough and having a rear end for connection with a second fluidconducting line and an opposite forward end. The first and second coupling members are configured such that the forward end of one of the coupling members can be axially inserted into the forward end of the other coupling member for establishing a continuous fluid flow path between the coupling members. The second coupling member further includes a valve having a valve sleeve and a fixed valve stem coaxially disposed within the tubular body of the second coupling member. The valve sleeve is moved axially upon connection of the coupling members so as to open a fluid flow passage between the valve sleeve and the valve stem. The outer surface of the valve stem defines a plurality of circumferentially spaced depressions therein. A circumferential groove is defined in an inner surface of the tubular body and is spaced radially outward of and in axial alignment with the depressions in the valve stem. A plurality of separately formed, discrete retaining elements are respectively engaged partly in the depressions in the valve stem and partly in the groove in the tubular body. Each retaining element is captively retained between forwardly and rearwardly inclined surfaces of the corresponding depression and between forwardly and rearwardly inclined surfaces of the groove. Thus, the retaining elements cooperate with the surfaces of the groove and of the depressions to prevent axial movement of the valve stem.

In accordance with a preferred embodiment of the invention, there are three of the depressions defined in the outer surface of the valve stem and three of the retaining members, and the depressions and retaining members are substantially equally spaced about the circumference of the valve stem. Advantageously, the surfaces of the depressions are spherical in contour and the retaining members comprise spherical balls such as commonly used in ball bearings, which are readily and inexpensively obtained. This construction provides substantial stability to the valve stem so as to substantially prevent axial movement of the valve stem and also prevent the valve stem from undergoing rotational movements that would otherwise allow the valve stem to become skewed relative to the axis of the tubular body in which it is secured. Thus, the valve stem is securely retained in the tubular body coaxial therewith.

In order to facilitate assembly, the tubular body of the second coupling member advantageously includes a tubular outer body portion and a tubular inner body portion coaxially inserted into the outer body portion, the groove being defined in the inner body portion. The inner body portion in one embodiment comprises a tubular gland and a separately formed tubular adapter, the gland being arranged with a rear end thereof disposed proximate a forward end of the adapter. The rear end of the gland and the forward end of the adapter are configured so as to collectively define the groove that receives the retaining elements. Accordingly, the second coupling member can readily be assembled by inserting the valve stem with the retaining elements into the gland and inserting the resulting subassembly into the outer body portion, and then inserting the adapter into the outer body portion to capture the retaining elements. A screw connection between the adapter and the outer body portion preferably is provided so that the retaining elements can be securely clamped between the oppositely inclined surfaces of the adapter and the gland.

In a preferred embodiment of the invention, the rear end of the gland defines circumferentially spaced depressions therein, similar to those in the valve stem for receiving the retaining members. This construction provides still further stability to the valve stem. Flow restriction through the coupling is reduced in one embodiment by providing circumferentially spaced recesses in the rear end of the gland between the circumferential locations of the retaining members.

In one embodiment, the second coupling member includes a valve spring for urging the valve sleeve forwardly so as to close the flow passage between the valve sleeve and the valve stem. The valve spring coaxially surrounds the valve stem and is disposed between a rearward-facing surface of the valve sleeve and a forward-facing surface of the gland. Advantageously, the second coupling member is configured such that a valve assembly, which includes the gland, the valve sleeve, the valve stem, the valve spring, and the retaining members, can be slid as a unit axially into a rear end of the outer body portion. The adapter then is commented to the rear end of the outer body portion, preferably by a screw connection therebetween, so as to retain the valve assembly in the second coupling member.

The second coupling member having the valve stem and retaining member in a preferred embodiment comprises a socket, and the first coupling member comprises a plug that is inserted into the socket to establish a connection between fluid lines. The plug includes a slidable valve member that is pushed rearwardly by the valve stem of the socket when the plug is inserted into the socket. Substantially simultaneously, a tubular member of the plug pushes the valve sleeve of the socket rearwardly. Thus, a continuous flow path is established between the fluid lines. The valve member of the plug is constrained to move only axially by a valve guide that is mounted in a generally fixed position within the plug. Advantageously, the valve guide comprises a tubular member having a closed end and an opposite open end into which a valve spring is received. The other end of the spring bears against the valve member of the plug. The valve guide at its open end has a flange extending radially outwardly therefrom. The valve guide is retained by a plurality of retaining members that abut the rear side of this flange. The retaining members advantageously comprise three separately formed flat plate-shaped members that are arranged into a triangular configuration in edge-to-edge abutting relation. The valve guide extends through the central opening of this triangular configuration, with the flange of the valve guide abutting the forward edges of the retaining members. The radially outer edges of the retaining members abut the inner surface of the tubular plug, and the rear edges of the retaining members abut a surface of an adapter that is attached to the rear end of the plug. The retaining members can be made very inexpensively, for example by stamping from sheet metal.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a sectioned side elevation of male and female coupling members of a fluid coupling in accordance with one embodiment of the invention, shown in a disconnected state;

FIG. 2 is a view similar to FIG. 1, showing the fluid coupling in a connected state;

DETAILED DESCRIPTION OF THE DRAWINGS

Figure 3:
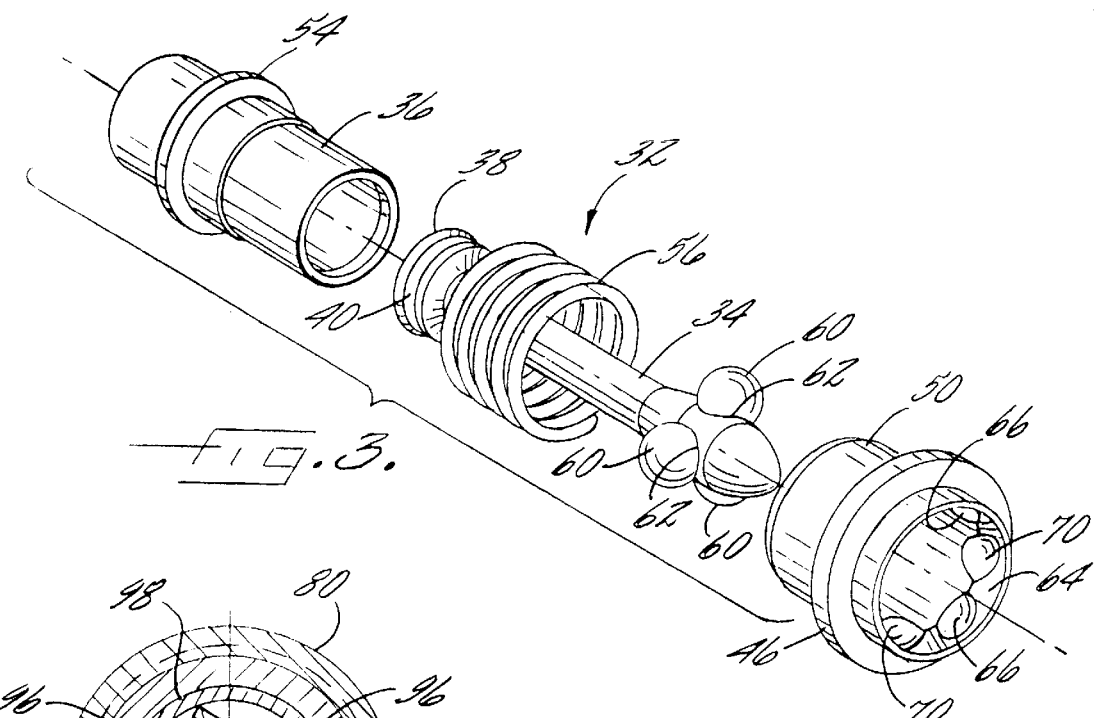
FIG. 3 is an exploded perspective view of a valve cartridge of the female coupling member in accordance with an embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to the drawings, a flat-face fluid coupling in accordance with one embodiment of the present invention is broadly designated by reference numeral 20. The coupling 20 includes a female-type coupling member or socket 22, and a male-type coupling member or plug 24 that is axially pushed into the socket 22 in order to establish a fluid connection between two fluid coupling lines to which the socket and plug are attached.

The socket 22 includes a tubular outer body 26 having an internally threaded rear end 28. A tubular, externally threaded adapter 30 is screwed into the rear end of the outer body 26. The adapter 30 is configured to receive a fitting (not shown) that is fixedly secured to the end of a fluid-conducting line so as to attach the socket to the line. For example, the adapter 30 can be internally threaded (as shown) for accepting an externally threaded fitting. Alternatively, the adapter can be externally threaded for connecting with an internally threaded fitting on the fluid line. Thus, a number of differently configured adapters each configured to screw into the outer body 26 can be provided, thereby enabling the socket 22 to interface with a variety of different configurations of fittings.

A valve 32 is coaxially disposed within the outer body 26. The valve 32 includes a fixed valve stem 34 and a valve sleeve 36 that is received over the valve stem 34 and is slidable relative to the stem along an axial direction of the outer body 26. The valve 32 depicted in the drawings is of the type sometimes referred to as a poppet valve. The valve stem 34 includes an enlarged head 38 located near the forward end of the outer body 26. Encircling the head 38 of the valve stem is an O-ring 40. The valve sleeve 36 is configured such that the inner surface of the sleeve compresses the O-ring 40 in a radially inward direction when the sleeve is slid forward over the head 38 of the valve stem. Thus, when the valve sleeve 36 is in this forward position, no fluid can flow between the sleeve and the head 38 of the stem. This is the closed position of the valve as shown in FIG. 1.

The valve sleeve 36 can be slid axially rearwardly so as to open the valve as shown in FIG. 2. In the open position, fluid can flow out the socket 22 through the space between the sleeve 36 and the valve stem head 38 as indicated by the arrows in FIG. 2. The valve sleeve 36 is pushed rearwardly upon insertion of the plug 24 into the socket, as further described below, by a tubular plunger 42 that is coaxially disposed within the outer body 26 and surrounds the valve sleeve 36 and the valve stem head 38. The outer surface of the plunger 42 is only slightly smaller in diameter than the inner surface of the outer body 26, such that the plunger closely fits in the outer body but is free to slide therein along the axial direction. The plunger 42 is urged toward a forward position by a plunger spring 44 coaxially surrounding the plunger and compressed between the rear end of the plunger and a radial flange 46 that extends radially outwardly from a tubular gland 50 coaxially disposed within the outer body 26 and located rearward of the plunger. Forward movement of the plunger is limited by a radially outwardly projecting flange 48 on the plunger abutting a corresponding rearwardly facing shoulder 29 formed on the inner surface of the outer body 26. In this forwardmost position of the plunger 42, the front face of the plunger 42 is substantially flush with the front face of the valve stem head 38 and with the front face of the outer body 26, as shown in FIG. 1. The forward end of the plunger 42 defines a radially inwardly extending flange 52 that has an inner diameter slightly greater than the outer diameter of the valve sleeve 36 such that the plunger 42 can freely slide over the valve sleeve. The valve sleeve 36 includes a radially outwardly extending flange 54 that has an outer diameter slightly smaller than the inner diameter of the plunger 42. When the valve sleeve 36 and plunger 42 are in their forward positions, their respective flanges 54 and 52 are axially spaced apart. When the plunger 42 is pushed axially rearwardly, the valve sleeve does not begin to move rearwardly until the inwardly extending flange 52 of the plunger comes to abut the outwardly extending flange 54 of the valve sleeve; further rearward movement of the plunger then causes the valve sleeve 36 to be pushed rearwardly, thereby opening the valve 32 of the socket.

The valve sleeve 36 is urged forwardly by a valve spring 56 that is compressed between the flange 54 of the valve sleeve and a forward end of the gland 50. Forward movement of the valve sleeve 36 is limited by interference between the tapered forward end of the valve sleeve and the O-ring 40 and valve head 38.

The gland 50 is inserted into the rear end of the outer body 26 before the adapter 30 is screwed into the outer body. A forward surface of the flange 46 of the gland abuts a corresponding inwardly extending, rearward-facing shoulder formed in the inner surface of the outer body 26.

The valve stem 34 is retained in a fixed position in the socket by a combination of elements including surfaces defined on the adapter 30, the gland 50, and the valve stem 34, and by retaining elements that interact with these surfaces. Advantageously, none of the members require threads (except for those for mating the adapter to the outer body), and the assembly can be assembled and disassembled without any tools beyond a pair of wrenches for screwing the adapter 30 into the outer body 26. More particularly, the socket includes retaining elements in the form of a number (preferably three) of balls 60 that engage a corresponding number of depressions 62 formed in the outer surface of the valve stem 34. The depressions 62 preferably are part-spherical in contour and have a radius of curvature matching that of the balls 60 so that the balls seat in the depressions with substantially no play therebetween. The depressions 62 define surfaces that are oppositely inclined in the axial direction, such that as long as the balls 60 remain seated in the depressions, the balls cannot move axially with respect to the valve stem 34.

The balls are kept seated in the depressions by oppositely inclined surfaces of the gland 50 and adapter 30. The gland and adapter collectively form a tubular inner body that is coaxially disposed within the outer body 26. This inner body defines a circumferential groove located radially outward of and in general axial alignment with the depressions 62 in the valve stem. More specifically, the gland 50 at its rear end defines a generally conical surface 64 that faces generally toward the forward end of the adapter 30. The surface 64 is so located that the balls 60 seated in the depressions 62 make contact with the surface 64. Advantageously, the surface 64 has a contour in the axial-radial plane that generally matches the radius of curvature of the balls. Still more advantageously, the conical surface 64 of the gland includes part-spherical depressions 66 (best seen in FIG. 3) similar to the depressions in the valve stem. A point contact between the balls 60 and the conical surface of the gland 50 can alternatively be provided by forming the surface 64 as a straight conical surface without any such depressions. The depressions 66 in the gland 50 prevent the valve stem 34 from rotating about its own axis and prevent the balls 60 from moving in a circumferential direction; however, this prevention of rotation may not be needed in some applications. The point contact provided by a straight conical surface would be adequate to prevent axial movement of the valve stem regardless of whether the valve stem were able to rotate about its axis. The balls 60 are prevented from moving axially rearwardly by a conical surface 68 of the adapter 30 that faces generally toward the rear end of the gland 50. The adapter surface 68 comes into abutment with the balls 60 when the adapter is screwed into the rear end of the outer housing 26. This surface 68 of the adapter is a straight conical surface so as to form point contacts with the balls in the illustrated embodiment shown in the drawings, but alternatively could have some concavity in the axial-radial plane to increase the contact area with the balls, if desired.

Thus, it will be appreciated that the gland surface 64 and the adapter surface 68 are oppositely inclined, the surface 64 facing generally rearwardly and the surface 68 facing generally forwardly. Similarly, the depressions 62 in the valve stem define oppositely inclined surfaces that face rearwardly and forwardly. When the balls 60 are in simultaneous contact with all of these various surfaces, the valve stem 34 is firmly fixed and prevented from moving rearwardly or forwardly.

The gland 50 preferably includes recesses 70 formed in the conical surface 64 at locations circumferentially in between the ball-receiving depressions 66, as best seen in FIG. 3. The recesses 70 serve to increase the flow area available for fluid as it flows through the socket 22 between the inner surface of the gland 50 and the outer surface of the valve stem 34. If additional flow area is not needed in a particular application, these recesses 70 can be omitted. Flow over the rear end of the valve stem 34 is facilitated by forming the rear end to have a faired shape such as a bullet shape as shown.

The valve 32 of the socket 22 is opened by pushing the plug 24 into the socket 22. As further described below, the plug 24 includes a plug body 80 of tubular shape. The forward end of the plug body is configured so that it can be pushed into the socket between the outer body 26 and the valve sleeve 36. When the plug body is pushed into the socket, the plug body pushes the socket plunger 42 rearwardly so as to abut the valve sleeve flange 54, and further insertion of the plug into the socket then causes the valve sleeve 36 to be moved rearwardly, thus opening the valve 32.

At the same time, a valve 82 of the plug 24 is opened by virtue of the valve stem 34 of the socket engaging a slidable valve member 84 of the plug valve 82. Because the valve stem 34 is fixed, the insertion of the plug 24 into the socket 22 causes the valve member 84 to be moved relatively rearwardly within the plug body 80. The plug valve 82 is formed by the valve member 84 and the inner surface of the plug body 80 adjacent its forward end. More particularly, the outer diameter of the valve member 84 is only slightly smaller than the inner diameter of the plug body 80 at its forward end. An O-ring 86 is retained in a groove formed in the inner surface of the plug body. When the plug is disconnected from the socket, the plug valve member 84 is urged toward a forward position by a valve spring 88 such that the O-ring 86 is compressed between the valve member and the plug body, thereby closing the plug valve 82. Rearward of the O-ring 86 the inner surface of the plug body increases in diameter, such that sliding the valve member 84 rearwardly by a sufficient distance causes a flow path to be created between the outer surface of the valve member 84 and the inner surface of the plug body. The inner diameter of the plug body where the O-ring 86 is located is slightly larger than the outer diameter of the socket valve sleeve 36.

When the plug 24 is pushed into the socket 22, the valve stem 34 immediately begins moving the plug valve member 84 relatively rearwardly within the plug body 82. During the initial travel of the plug body into the socket 22, the socket valve 32 remains closed because of the axial spacing between the plunger flange 52 and the flange 54 on the valve sleeve 36 of the socket valve, and the plug valve 82 remains closed initially because the valve member 84 extends forward of the O-ring 86. Also, during this initial travel of the plug body into the socket, the plug body moves over the valve sleeve 36; at some point, the valve member 84 moves rearward of the O-ring 86, and further movement causes the O-ring 86 to move over the valve sleeve 36, which is still in its forwardmost closed position. With further insertion of the plug into the socket, the plunger flange 52 comes into abutment with the valve sleeve flange 54; at this point, the plug valve 84 has almost reached the increased-diameter portion of the plug body's inner surface. Still further insertion of the plug into the socket now begins to cause the socket valve sleeve 36 to move rearwardly in the socket, and the plug valve 84 moves still further rearward relative to the plug body. Thus, when the socket valve 32 opens at the moment the valve sleeve 36 disengages the O-ring 40 on the valve stem head 38, a continuous flow path is created between the socket and the plug. Prior to this moment, a substantially leak-free connection between the plug and socket is maintained by the sealing engagement between the plug body 82 and the valve sleeve 36 provided by the O-ring 86.

Movement of the valve member 84 within the plug is guided in part by a valve guide 90 and a pin 92 fixed to the valve member 84. The valve guide 90 comprises a tubular member having a closed rear end and an open forward end. The forward end includes a flange 94 that extends radially outwardly. The valve spring 88 is sleeved over the pin 92 and has a diameter slightly smaller than the inner diameter of the valve guide 90; a rear portion of the spring is received into the valve guide, bottoming out on the closed end thereof. The spring 88 is sleeved over the pin 92 on the valve member, and its forward end abuts the valve member. The pin 92 has a sufficient axial length to extend into the valve guide 90.

The valve guide 90 is retained in a generally fixed position in the plug by a plurality of retaining members 96 that interact with the valve guide and with internal surfaces of the plug. More particularly, the plug includes a tubular gland 98 that is received into the rear end of the plug body 80. The gland 98 has cylindrical inner and outer surfaces, and a radially outwardly extending flange 100 formed on its outer surface. The flange 100 abuts a rearward-facing shoulder 102 formed in the inner surface of the plug body. The plug further includes an adapter 104 that screws into the rear end of the plug body 80, similar to the adapter for the socket as previously described. The forward end of the adapter 104 abuts the flange 100 on the gland 98 and urges the flange against the shoulder 102 in the plug body, thereby fixing the gland in position.

Figure 5:
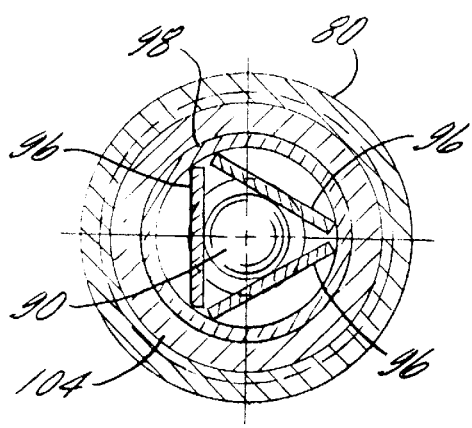
FIG. 5 is a cross-sectional view of the male coupling member taken on a plane through the retaining members.
Figure 6:
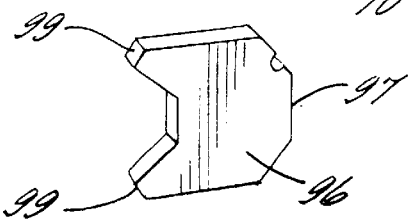
FIG. 6 is a perspective view of one of the retaining members of the male coupling member.
Figure 4:
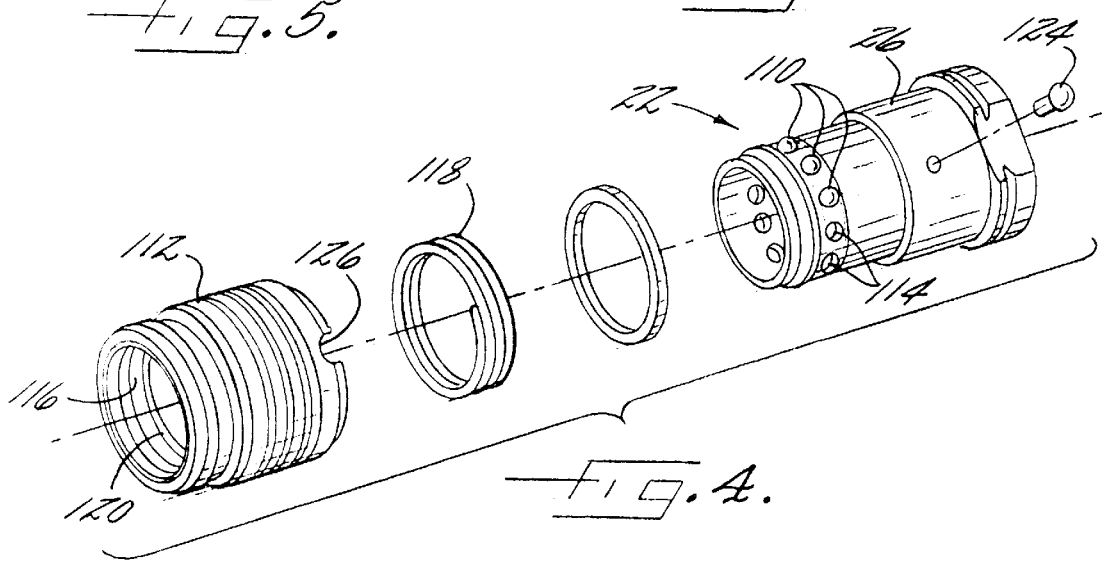
FIG. 4 is an exploded perspective view of the outer housing, sleeve, and sleeve spring of the female coupling member.

With reference to FIGS. 5 and 6, the retaining members 96 comprise three plate-shaped members that are disposed between the outer surface of the valve guide 90 and the inner surface of the gland 98, and are abutted at their forward ends 97 by the flange 94 of the valve guide and at their rear ends 99 by a conical surface 106 of the adapter 104. The retaining members 96 are arranged into a triangular structure in which the edge of each retaining member that is in contact with the inner surface of the gland 98 abuts a corresponding edge of an adjacent one of the retaining members. The triangular structure defines a central opening therethrough, and this central opening is sized such that the valve guide 90 fits therein; the outer surface of the valve guide is closely adjacent or in contact with the inwardly facing plane surfaces of the retaining members 96, as shown in FIG. 5. The retaining members thus keep the valve guide generally centered in the plug body; some limited amount of play between the valve guide and the retaining members in the radial direction can be tolerated. The valve guide is prevented from moving rearwardly by the engagement of the flange 94 against the forward edges 97 of the retaining members 96.

The use of the plate-shaped retaining members 96 has a number of advantages. The retaining members can be made very inexpensively, for example by stamping them from sheet metal. The plug can be assembled without any tooling beyond a pair of wrenches for screwing the adapter 104 into the plug body 82. The retaining members also cause minimal flow restriction.

Once the plug 24 is inserted into the socket 22, there must be some provision for locking the plug and socket together so they do not inadvertently separate during use. To this end, the socket 22 includes a plurality of locking balls 110 and a ball-retaining sleeve 112. The socket outer body 26 includes tapered apertures 114 that extend radially inwardly through the side wall of the body 26 and taper from a larger diameter to a smaller diameter in the radially inward direction. The radially innermost end of each aperture has a diameter that is slightly smaller than the diameter of the locking balls 110. The locking balls 110 are retained in these apertures, and can be moved in the radial direction within the apertures. The sleeve 112 includes an amnular channel 116 in its inner surface facing the outer body 26. When the socket is disconnected from the plug, this channel 116 is in axial alignment with the locking balls 110, which are spaced apart in a circumferential ring about the socket; the socket plunger 42 forces the balls 110 radially outwardly in the apertures 114 such that they project partially into the channel 116 as shown in FIG. 1. A sleeve spring 118 urges the sleeve 112 forwardly such that a forward-facing ramp 120 at the rear end of the channel 116 abuts the balls 110. When the plug is inserted into the socket, the socket plunger 42 is moved rearwardly until it no longer covers the apertures 114 in the outer body 26. The sleeve 112 is thus free to move forward under the action of the spring 118, such that the forward-facing ramp 120 urges the balls 110 radially inwardly within the apertures 114 so that the balls project radially inward of the inner surface of the outer body 26. The plug body 80 includes a circumferentially extending groove or channel 122 formed in its outer surface and so located near the forward end of the plug that when the plug is inserted sufficiently far into the socket to establish the fluid connection between the socket and plug, the channel 122 of the plug body becomes aligned with the apertures 114, and thus the balls 110 are forced by the sleeve 112 to extend partially into this channel 122. This locks the plug and the socket together as shown in FIG. 2. The plug and socket thus comprise a push-to-connect coupling system.

To separate the plug from the socket, the sleeve 112 is moved rearwardly relative to the socket outer body 26 until the channel 116 in the inner surface of the sleeve becomes aligned with the locking balls 110; this allows the plug to be withdrawn from the socket. It will be recognized that if the sleeve 112 is fixedly mounted in a structure, disconnection of the plug from the socket can be accomplished simply by pulling the plug out, since this will cause the outer body 26 of the socket to move in the direction of the pulling force until the locking balls 110 become aligned with the sleeve channel 116. Alternatively, if the plug is fixedly mounted in a structure, the socket can be disconnected from the plug by grasping the sleeve 112 and pulling it away from the plug. Thus, the plug and socket enable pull-to-disconnect operation when either the sleeve 112 or the plug is fixedly mounted.

Inadvertent retraction of the sleeve 112 can be prevented by a sleeve lock 124 comprising a screw, pin, or the like fixed in the outer body 26 and extending radially outwardly from the outer surface thereof. The lock 124 is located immediately adjacent the rear end of the sleeve when the sleeve is in its forwardmost position. The rear end of the sleeve 112 includes a notch or cut-out 126 that extends axially forward a sufficient amount to allow the sleeve 112 to be retracted rearwardly when the notch 126 is circumferentially aligned with the sleeve lock 124. However, if the sleeve 112 is rotated to a position in which the notch 126 is not aligned with the lock 124, the lock 124 prevents the sleeve from moving rearwardly.

From the foregoing, it will be appreciated that the invention provides a coupling system affording a number of distinct advantages. The construction of the socket and plug minimizes the use of threads, which are used only for connecting the adapters to the bodies of the coupling members. This results in improved ruggedness of the parts and assemblies, and also facilitates simpler and faster assembly of the coupling members. With respect to the socket 22, the construction is such that the gland 50, the valve sleeve 36, the valve stem 34, the valve spring 56, and the retaining balls 60 collectively form a valve assembly that can be slid as a unit axially into a rear end of the outer body 26. The adapter 30 is then screwed into the outer body 26 to retain the valve assembly in the socket. Additionally, the socket and plug are constructed so that no special tools are required for assembling and disassembling them. Replacing O-rings in the socket or plug can easily be accomplished in view of the ease with which they can be disassembled and reassembled. The invention thus eliminates the need to replace whole subassemblies when an O-ring fails.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fluid coupling for fluid-conducting lines, comprising:

a first coupling member including a tubular body having an axial fluid flow passage therethrough and having a rear end for connection with a first fluid-conducting line and an opposite forward end;

a second coupling member including a tubular body having an axial fluid flow passage therethrough and having a rear end for connection with a second fluid-conducting line and an opposite forward end, the first and second coupling members being configured such that the forward end of one of the coupling members can be axially inserted into the forward end of the other coupling member for establishing a continuous fluid flow path between the coupling members, the second coupling member further including:

a valve having a valve sleeve and a fixed valve stem coaxially disposed within the tubular body of the second coupling member, the valve sleeve being moved axially upon connection of the coupling members so as to open a fluid flow passage between the valve sleeve and the valve stem, the valve stem having a forward end proximate the forward end of the second coupling member and an opposite rear end and an outer surface extending between the forward and rear ends, the outer surface of the valve stem defining a plurality of circumferentially spaced depressions therein;

a circumferential groove defined in an inner surface of the tubular body and spaced radially outward of and in axial alignment with the depressions in the valve stem; and a plurality of separately formed, discrete retaining elements respectively engaged partly in the depressions in the valve stem and partly in the groove in the tubular body, each retaining element being captively retained between forwardly and rearwardly inclined surfaces of the corresponding depression and between forwardly and rearwardly inclined surfaces of the groove, whereby the retaining elements cooperate with the surfaces of the groove and of the depressions to prevent axial movement of the valve stem.

2. The fluid coupling of claim 1, wherein there are three of the depressions defined in the outer surface of the valve stem and three of the retaining members, the depressions and retaining members being substantially equally spaced about the circumference of the valve stem.

3. The fluid coupling of claim 1, wherein the surfaces of the depressions are spherical in contour and the retaining members comprise spherical balls.

4. The fluid coupling of claim 1, wherein the tubular body of the second coupling member includes a tubular outer body portion and a tubular inner body portion coaxially disposed within the outer body portion, the groove being defined in the inner body portion.

5. The fluid coupling of claim 4, wherein the inner body portion comprises a tubular gland and a separately formed tubular adapter, the gland being arranged with a rear end thereof disposed proximate a forward end of the adapter, the rear end of the gland and the forward end of the adapter being configured so as to collectively define the groove that receives the retaining elements.

6. The fluid coupling of claim 5, wherein the adapter defines a generally conical surface that extends forwardly and radially outwardly and forms one of the oppositely inclined surfaces of the groove.

7. The fluid coupling of claim 6, wherein the rear end of the gland defines a generally conical surface that extends rearwardly and radially outwardly and forms another of the oppositely inclined surfaces of the groove.

8. The fluid coupling of claim 7, wherein the surfaces of the depressions in the valve stem are spherical in contour and the retaining members comprise spherical balls.

9. The fluid coupling of claim 8, wherein the rear end of the gland defines circumferentially spaced depressions therein for receiving the spherical ball retaining members.

10. The fluid coupling of claim 6, wherein a rear end portion of the gland is coaxially received inside a forward end portion of the adapter.

11. The fluid coupling of claim 6, wherein the forward end of the adapter is externally threaded and is screwed into an internally threaded rear end portion of the outer body portion so as to bring the generally conical surface of the adapter into engagement with the spherical ball retaining members.

12. The fluid coupling of claim 6, wherein the rear end of the gland defines recesses therein, the recesses being in axial alignment with and radially outward of the retaining members and being located circumferentially between the retaining members.

13. The fluid coupling of claim 12, wherein the rear end of the gland defines circumferentially spaced depressions therein for receiving the spherical ball retaining members, and wherein the recesses in the rear end of the gland are located circumferentially between the depressions in the rear end of the gland.

14. The fluid coupling of claim 6, wherein the second coupling member includes a valve spring coaxially surrounding the valve stem and disposed between a forward-facing surface of the gland and a rearward-facing surface of the valve sleeve for urging the valve sleeve forwardly so as to close the flow passage between the valve sleeve and the valve stem when the coupling members are disconnected.

15. The fluid coupling of claim 14, wherein the second coupling member is configured such that a valve assembly that includes the gland, the valve sleeve, the valve stem, the valve spring, and the retaining members can be slid as a unit axially into a rear end of the outer body portion.

16. The fluid coupling of claim 15, wherein there is a screw connection between the adapter and the outer body portion such that the adapter retains the valve assembly in the second coupling member.

17. A socket for a quick-action fluid coupling, comprising:

a tubular body having an axial fluid flow passage therethrough and having a rear end for connection with a fluid-conducting line and an opposite forward end, the tubular body being configured such that plug-type coupling member on another fluid-conducting line can be axially inserted into the forward end of the tubular body for establishing a continuous fluid flow path between the fluid-conducting lines;

a valve having a valve sleeve and a fixed valve stem coaxially disposed within the tubular body, the valve sleeve operable to be moved axially toward the rear end of the tubular body upon insertion of the plug-type coupling member so as to open a fluid flow passage between the valve sleeve and the valve stem, the valve stem having a forward end proximate the forward end of the tubular body and an opposite rear end and an outer surface extending between the forward and rear ends, the outer surface of the valve stem defining a plurality of circumferentially spaced depressions therein;

a circumferential groove defined in an inner surface of the tubular body and spaced radially outward of and generally in axial alignment with the depressions in the valve stem; and a plurality of separately formed, discrete retaining elements respectively engaged partly in the depressions in the valve stem and partly in the groove in the tubular body, each retaining element being captively retained between forwardly and rearwardly inclined surfaces of the corresponding depression and between forwardly and rearwardly inclined surfaces of the groove, whereby the retaining elements cooperate with the surfaces of the groove and of the depressions to prevent axial movement of the valve stem.

18. The socket of claim 17, wherein there are three of the depressions defined in the outer surface of the valve stem and three of the retaining members, the depressions and retaining members being substantially equally spaced about the circumference of the valve stem.

19. The fluid coupling of claim 17, wherein the surfaces of the depressions are spherical in contour and the retaining members comprise spherical balls.

20. The fluid coupling of claim 17, wherein the tubular body includes a tubular outer body portion and a tubular inner body portion coaxially disposed within the outer body portion, the groove being defined in the inner body portion.

21. The fluid coupling of claim 20, wherein the inner body portion comprises a tubular gland and a separately formed tubular adapter, the gland being arranged with a rear end thereof disposed proximate a forward end of the adapter, the rear end of the gland and the forward end of the adapter being configured so as to collectively define the groove that receives the retaining elements.

22. The fluid coupling of claim 21, wherein the adapter defines a generally conical surface that extends forwardly and radially outwardly and forms one of the oppositely inclined surfaces of the groove.

23. The fluid coupling of claim 22, wherein the rear end of the gland defines a generally conical surface that extends rearwardly and radially outwardly and forms another of the oppositely inclined surfaces of the groove.

24. The fluid coupling of claim 23, wherein the surfaces of the depressions in the valve stem are spherical in contour and the retaining members comprise spherical balls.

25. The fluid coupling of claim 24, wherein the rear end of the gland defines circumferentially spaced depressions therein for receiving the spherical ball retaining members.

26. The fluid coupling of claim 22, wherein a rear end portion of the gland is coaxially received inside a forward end portion of the adapter.

27. The fluid coupling of claim 22, wherein the forward end portion of the adapter is externally threaded and is screwed into an internally threaded rear end portion of the outer body portion so as to bring the generally conical surface of the adapter into engagement with the spherical ball retaining members.

28. The fluid coupling of claim 22, wherein the rear end of the gland defines recesses therein, the recesses being in axial alignment with and radially outward of the retaining members and being located circumferentially between the retaining members.

29. The fluid coupling of claim 28, wherein the rear end of the gland defines circumferentially spaced depressions therein for receiving the spherical ball retaining members, and wherein the recesses in the rear end of the gland are located circumferentially between the depressions in the rear end of the gland.

30. The fluid coupling of claim 22, further comprising a valve spring coaxially surrounding the valve stem and disposed between a forward-facing surface of the gland and a rearward-facing surface of the valve sleeve for urging the valve sleeve forwardly so as to close the flow passage between the valve sleeve and the valve stem.

31. The fluid coupling of claim 30, wherein the socket is configured such that a valve assembly that includes the gland, the valve sleeve, the valve stem, the valve spring, and the retaining members can be slid into position as a unit through a rear end of the outer body portion.

32. The fluid coupling of claim 31, wherein there is a screw connection between the adapter and the outer body portion such that the adapter retains the valve assembly in the socket.

* * * * *